(12) United States Patent
Paku et al.

(10) Patent No.: US 8,544,147 B2
(45) Date of Patent: Oct. 1, 2013

(54) GROMMET

(75) Inventors: Kinryu Paku, Yokkaichi (JP); Tsutomu Sakata, Yokkaichi (JP); Daiki Nagayasu, Yokkaichi (JP); Masahide Tsuru, Yokkaichi (JP)

(73) Assignee: Sumitomo Wiring Systems, Ltd. (JP)

( * ) Notice: Subject to any disclaimer, the term of this patent is extended or adjusted under 35 U.S.C. 154(b) by 230 days.

(21) Appl. No.: 12/922,238

(22) PCT Filed: Dec. 17, 2008
(Under 37 CFR 1.47)

(86) PCT No.: PCT/JP2008/072988
§ 371 (c)(1),
(2), (4) Date: May 19, 2011

(87) PCT Pub. No.: WO2009/113220
PCT Pub. Date: Sep. 17, 2009

(65) Prior Publication Data
US 2011/0265286 A1 Nov. 3, 2011

(30) Foreign Application Priority Data

Mar. 13, 2008 (JP) .................. 2008-064931

(51) Int. Cl.
*F16L 5/00* (2006.01)
(52) U.S. Cl.
USPC ............................ 16/2.2; 16/2.1; 174/153 G
(58) Field of Classification Search
USPC .................... 16/2.1–2.5; 174/153 G
See application file for complete search history.

(56) References Cited

U.S. PATENT DOCUMENTS

| 4,839,937 A | * | 6/1989 | Oikawa et al. | 16/2.1 |
| 4,928,349 A | * | 5/1990 | Oikawa et al. | 16/2.1 |
| 5,337,447 A | * | 8/1994 | Tanaka et al. | 16/2.2 |

FOREIGN PATENT DOCUMENTS

| JP | 50-000351 | 1/1975 |
| JP | 2000-358315 | 12/2000 |
| JP | 2002-27641 | 1/2002 |
| JP | 2003-32858 | 1/2003 |
| JP | 2003-199233 | 7/2003 |
| JP | 2007-135253 | 5/2007 |

* cited by examiner

*Primary Examiner* — Jeffrey O Brien
(74) *Attorney, Agent, or Firm* — Gerald E. Hespos; Michael J. Porco; Matthew T. Hespos (57) ABSTRACT

A grommet includes two semicircular closing plate sections that protrude from inner peripheries of a larger diameter end of an enlarging diameter tubular section provided with a vehicle body latch recess. Two half ring sections protrude from peripheral edges of central circular cut-outs at opposed ends of the semicircular closing plate sections. Adhesive tape is wound around the half ring sections. The semicircular closing plate sections are thinner than the enlarging diameter tubular section and have bellows-like configurations with projections and depressions. The half ring sections deform in accordance with an outer diameter of the wire harness and a bending direction of the wire harness. Deformation of the semicircular closing plate sections is absorbed by the bellows-like configurations, and the vehicle body latch recess of the enlarging diameter tubular section coupled to an outer periphery of the semicircular closing plate sections.

3 Claims, 7 Drawing Sheets

GROMMET

BACKGROUND OF THE INVENTION

1. Field of the Invention

This invention relates to a grommet, and more particularly relates to a grommet that is attached to a wire harness to be arranged in a motor vehicle and is installed in a through-hole in a vehicle body panel to protect, waterproof, and dustproof the wire harness.

2. Description of the Related Art

Heretofore, a grommet made of rubber or elastomer is attached to a wire harness to be arranged from an engine room in a motor vehicle to a passenger room. The grommet is installed in a through-hole in a vehicle body panel that partitions a vehicle body into an engine room and a passenger room to protect the wire harness passing the through-hole and to waterproof, dustproof, sound-insulate the passenger room from the engine room.

Figure 8A:
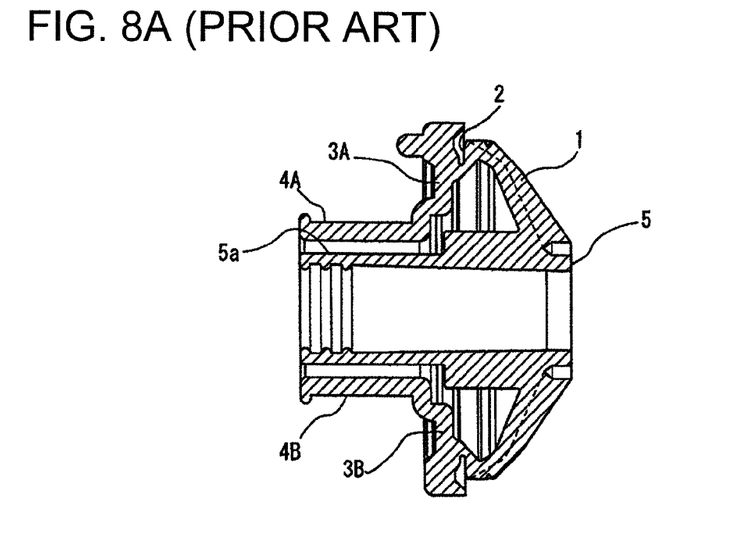
FIGS. 8A and 8B are longitudinal section views of a conventional grommet.

The present applicant has disclosed such a kind of grommets in JP 2007-135253 A, as shown in FIG. 8A of the present application. The grommet includes an enlarging diameter tubular section 1 provided on an outer periphery of a larger diameter side with a vehicle body latch recess 2, closing plates 3A, 3B provided on an inner periphery of the enlarging diameter tubular section 1, and a pair of half ring sections 4A, 4B provided on opposed central parts of the closing plates 3A, 3B. A smaller diameter tubular section 5 extends from a central part of a smaller diameter side of the enlarging diameter tubular section 1 to be continued to a central inner tube 5a disposed between the pair of half ring sections 4A, 4B.

Figure 8B:
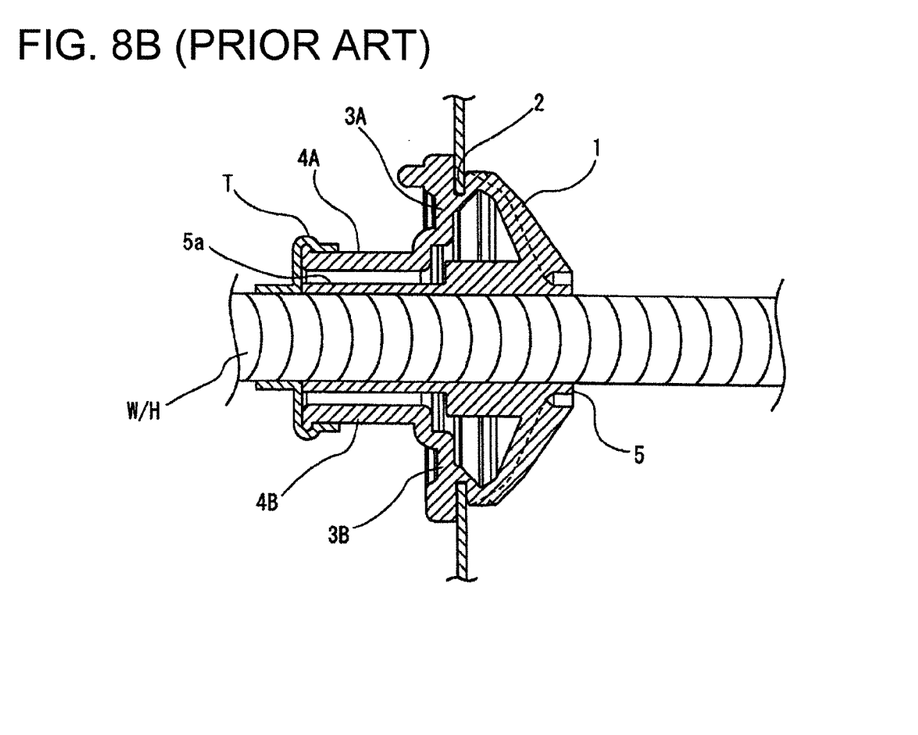

As shown in FIG. 8B, after a wire harness W/H is passed through the smaller diameter tubular section 5 that protrudes toward the larger diameter side in the enlarging diameter tubular section 1, a tape T is wound around on an outer periphery of the pair of half ring sections 4A, 4B at an outer periphery side of the central inner tube 5a at a protruding side of the smaller diameter tubular section 5. The tape T is also wound around an outer periphery of the wire harness W/H drawn out from the central inner tube 5a to secure the grommet to the wire harness W/H.

In the grommet of JP 2007-135253, since the smaller diameter tubular section 5 does not protrude outward from the smaller diameter side of the enlarging diameter tubular section 1 and extends in an interior of the enlarging diameter tubular section 1, there is an advantage that can shorten the grommet.

Figure 9A:
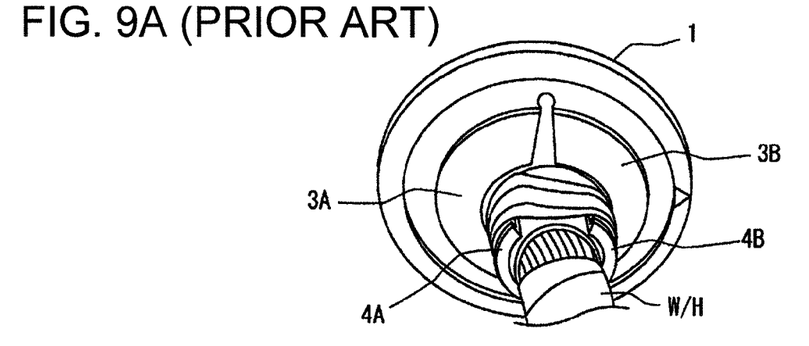
FIGS. 9A to 9C are perspective views of the conventional grommet, illustrating problems in the conventional grommet.

However, in the case where the wire harness W/H has a large size in outer diameter, the smaller diameter tubular section 5 is widen in an oval figure in cross section, and the half ring sections 4A, 4B are also deformed in the oval figure in cross section with the tape T winding around an outer periphery of the half ring sections 4A, 4B. If the half ring sections 4A, 4B do not define a complete circle in cross section, as shown in FIG. 9A, closing plates 3A, 3B connected to proximal ends of the half closing rings 4A, 4B are pulled to widen a slit between opposed surfaces of the closing plates 3A, 3B to cause a clearance C and to deform a profile of the enlarging diameter tubular section 1 coupled to the semicircular closing plate sections 3A, 3B. In result, the vehicle body latch recess 2 provided on the outer periphery of the enlarging diameter tubular section 1 is also deformed into the oval figure in cross section, so that the recess 2 cannot be closely engaged with a through-hole in a vehicle body panel. Under this condition, water leakage may occur via the through-hole in the vehicle body panel.

Figure 9B:
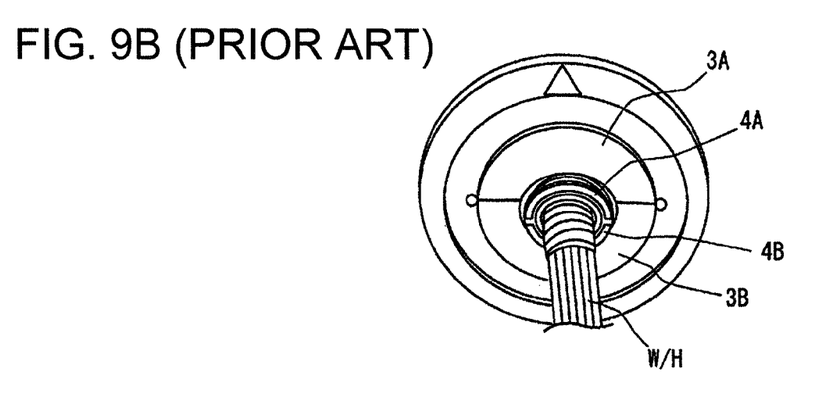

On the other hand, in the case where the wire harness W/H has a small size in outer diameter, outer peripheries of the half closing rings 4A, 4B are compressed, with the tape T winding around the rings 4A, 4B, and the rings 4A, 4B and the tape T are deformed into an oval figure, as shown in FIG. 9B. In result, they are changed to the state shown in FIG. 9A, and the vehicle body latch recess 2 is deformed through the semicircular closing plate sections 3A, 3B. This may cause water leakage.

Figure 9C:
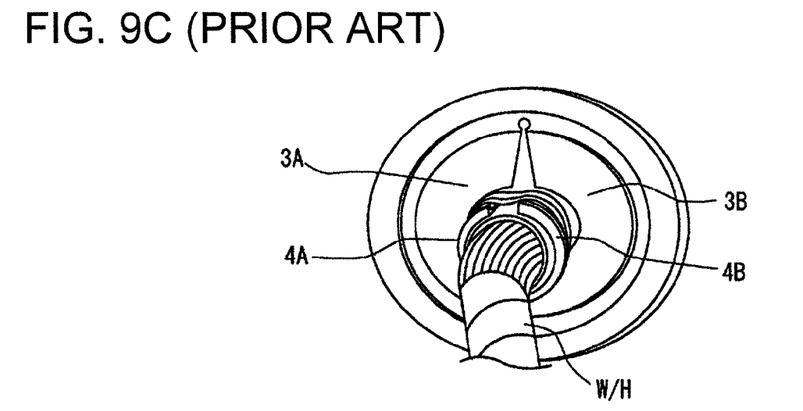

Further, if the half ring sections 4A, 4B and the wire harness W/H wound by the tape T are bent abruptly, as shown in FIG. 9C, the vehicle body latch recess 2 is deformed through the semicircular closing plate sections 3A, 3B. This may cause water leakage.

Further, the smaller diameter tubular section 5 extends in the enlarging diameter tubular section 1, as disclosed in JP 2007-135253. However, even if the smaller diameter tubular section 5 extends outward from the smaller diameter side of the enlarging diameter tubular section 1, the half ring sections 4A, 4B protrude from the half closing rings 3A, 3B, the half ring sections 4A, 4B cover the outer periphery of the wire harness W/H, and the tape is wound around the half ring sections 4A, 4B to secure the grommet to the wire harness W/H, the same problem described above will occur.

SUMMARY OF THE INVENTION

In view of the above problems, an object of the present invention is to provide a grommet wherein, when a pair of half ring sections that protrude from a pair of semicircular closing plate sections continued to a larger diameter side inner periphery of an enlarging diameter tubular section of the grommet are secured to a wire harness by winding a tape around the half ring sections, regardless of a size in outer diameter of the wire harness and even if the half ring sections are deformed by abruptly bending of the wire harness, deformation of the half ring sections can be absorbed so that the deformation does not affect the vehicle body latch recess, and water leakage can be prevented.

In order to achieve the above object, a grommet in accordance with the present invention comprises: a smaller diameter tubular section; an enlarging diameter tubular section that is continued to the smaller diameter tubular section and is provided on an outer periphery of a larger diameter side with a vehicle body latch recess; a pair of semicircular closing plate sections that protrude from inner peripheries of a larger diameter side end of the enlarging diameter tubular section in a direction perpendicular to an axial direction; and a pair of half ring sections that protrude from peripheral edges of central circular cut-out portions at opposed ends of the pair of semicircular closing plate sections in the axial direction. After a wire harness passes the smaller diameter tubular section, the enlarging diameter tubular section, and the pair of half ring sections, an adhesive tape is wound around outer peripheries of the pair of half ring sections, and the vehicle body latch recess provided on the outer periphery of the enlarging diameter tubular section is engaged with a vehicle body panel. The pair of semicircular closing plate sections have thicknesses smaller than a thickness of the enlarging diameter tubular section. The semicircular closing plate sections are formed into bellows-like configurations having projections and depressions in the axial direction that surround proximal ends of the pair of half ring sections and extend alternately in a radial direction to an outer peripheral connecting side to the enlarging diameter tubular section. In the case where the pair of half ring sections that protrude from central parts of the semicircular closing plate sections having the bellows-like configurations are deformed in accordance with a size in outer diameter of the wire harness secured to the half closing sections by winding of the adhesive tape, deformation of the semicircular closing plate sections is absorbed by stretch and compression of the bellows-like configurations before the deformation is propagated to the outer periphery of the enlarging diameter tubular section and deformation of the vehicle body latch recess of the enlarging diameter tubular section coupled to an outer periphery side of the semicircular closing plate sections is prevented.

As described above, in the grommet of the present invention, since the pair of semicircular closing plate sections are formed into the thin bellows-like configurations, in the case where the pair of half ring sections are deformed by a size in outer diameter of the wire harness and bending of the wire harness when the pair of half ring sections are secured to the wire harness by winding of the adhesive tape, the bellows-like configurations are compressed and stretched from the inside of the proximal ends that surround the half ring sections and deformation of the half ring sections is absorbed before the deformation is propagated to the outer peripheral side continued to the enlarging diameter tubular section, thereby preventing tension and compression loads from being propagated to the enlarging diameter tubular section. Consequently, the vehicle body latch recess provided on the outer periphery of the enlarging diameter tubular section can maintain the complete circle and can closely contact with the peripheral edge around the through-hole in the vehicle body panel without causing any displacement of the recess. This can prevent water leakage positively.

An outer periphery of the wire harness is directly covered with the pair of half ring sections that protrude from the pair of semicircular closing plate sections. The opposed ends of the semicircular closing plate sections are joined to each other when winding the adhesive tape.

That is, the pair of half ring sections surround the inner tube in the conventional grommet shown in FIGS. 8A and 8B. However, in the grommet of the present invention, the pair of half ring sections directly surround the outer periphery of the wire harness that passes the central circular cut-out portion of the opposed end of the pair of semicircular closing plate sections to secure the grommet to the wire harness by winding of the tape.

Thus, in the case where the pair of half ring sections are directly attached to the outer periphery of the wire harness, the half ring sections are susceptible to a size in outer diameter of the wire harness and bending of the wire harness. However, since the semicircular closing plate sections are formed into the bellows-like configurations, the configurations can absorb deformation and deleterious effect is not applied to the vehicle body latch recess. This can prevent water leakage.

Even if the smaller diameter tubular section passes a central space surrounded by the enlarging diameter tubular section and extends between the pair of semicircular closing plate sections to define a smaller diameter inner tubular section, the pair of half ring sections that protrude from opposed surfaces of the pair of semicircular closing plate sections define an outer tube that surrounds an outer periphery of the smaller diameter inner tubular section, as is the case with the conventional grommet shown in FIGS. 8A and 8B, since the semicircular closing plate sections are formed into the bellows-like configurations, the configurations can absorb deformation and deleterious effect is not applied to the vehicle body latch recess when the half ring sections are deformed upon winding the tape. This can prevent water leakage.

In the grommet of the present invention, the inserting side to the through-hole in the vehicle body panel becomes the smaller diameter tubular section side that protrudes from the smaller diameter end side of the enlarging diameter tubular section. The grommet is inserted into the through-hole merely by pushing the tubular portion on which the half ring sections protruding to the opposite side are wound by the tape. The vehicle body latch recess is engaged with the peripheral edge around the through-hole by a one-motion to secure the grommet to the vehicle body panel.

In order to facilitate a pushing operation of the grommet into the through-hole in the vehicle body panel by the one-motion, the enlarging diameter tubular section may be provided on the outer periphery with stepped projections that extend in the axial direction and are spaced apart from one another in the peripheral direction to reduces contact areas with the through-hole, thereby lowering an inserting force of the grommet. The enlarging diameter tubular section is provided on parts having no stepped portions with recesses in the axial direction to facilitate inward deflection of the enlarging diameter tubular section upon passing the through-hole, thereby further lowering the inserting force of the grommet.

As described above, in the grommet of the present invention, since the pair of half ring sections secured to the wire harness by winding of the tape protrude from the semicircular closing plate sections and the semicircular closing plate sections are formed into the thin bellows-like configurations, even if the half ring sections are deflected from a center line of the grommet on account of a size in outer diameter of the wire harness and abruptly bending of the wire harness drawn out from the grommet, deformation of the half ring sections can be absorbed by partial stretch and compression of the thin bellows-like configurations of the semicircular closing plate sections and the enlarging diameter tubular section coupled to the outer periphery of the half closing plates is not susceptible to deformation of the half ring sections. Consequently, it is possible to closely contact the vehicle body latch recess with the through-hole in the vehicle body panel and to surely prevent water leakage due to displacement of the recess.

DETAILED DESCRIPTION OF THE PREFERRED EMBODIMENTS

Referring now to FIGS. 1 to 7, embodiments of a grommet in accordance with the present invention will be described below.

FIGS. 1A to 4C show a first embodiment of a grommet 10 in accordance with the present invention.

Figure 1A:
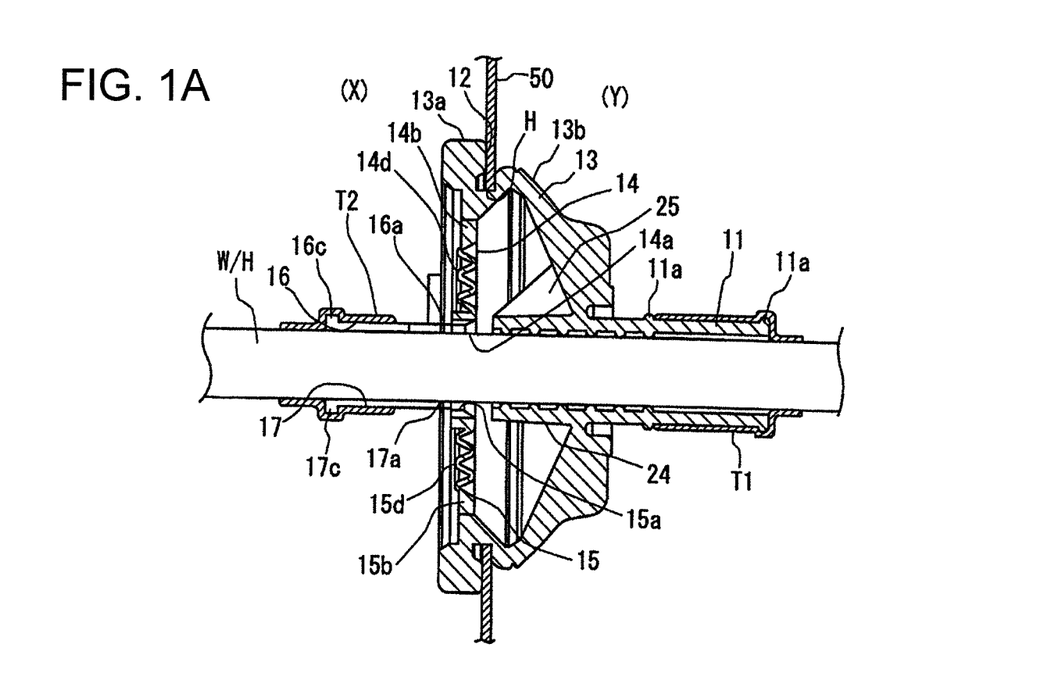
FIG. 1A is a longitudinal section view of a first embodiment of a grommet in accordance with the present invention.
Figure 1B:
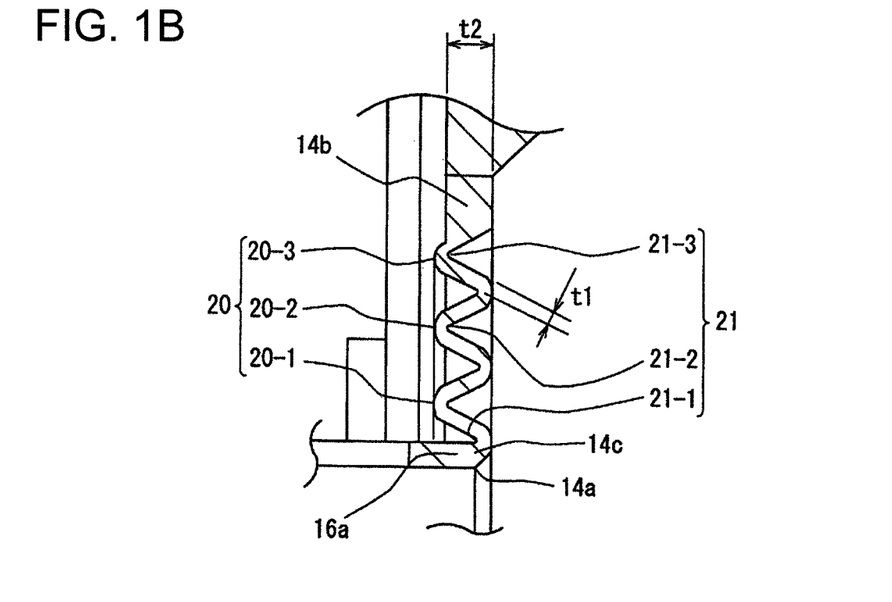
FIG. 1B is an enlarged view of a main part of the grommet shown in FIG. 1A.
Figure 2:
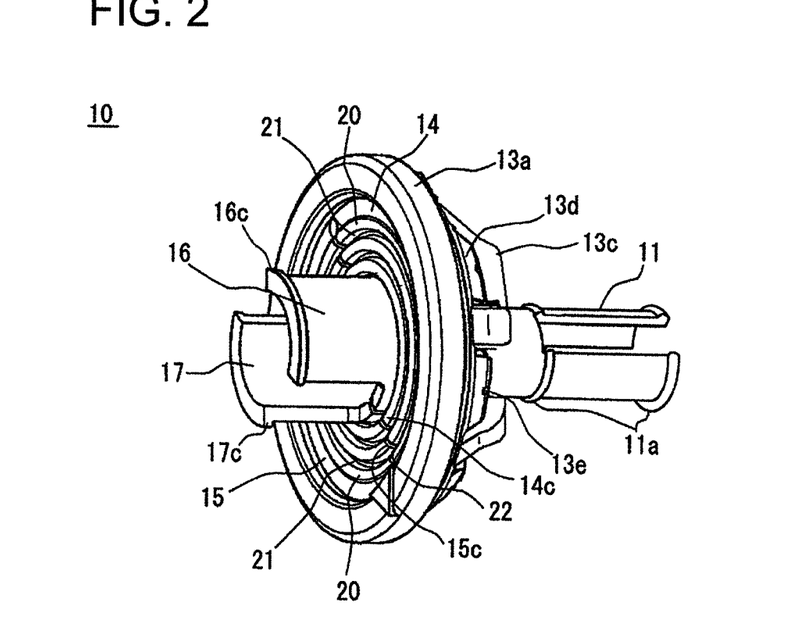
FIG. 2 is a perspective view of the grommet in the first embodiment shown in FIGS. 1A and 1B, illustrating bellows-like configurations of a pair of semicircular closing plate sections.

The grommet 10 is molded from rubber or elastomer. As shown in FIGS. 1A and 1B, the grommet 10 includes a smaller diameter tubular section 11 that is a front part in an inserting direction into a through-hole H in a vehicle body panel 50, an enlarging diameter tubular section 13 that is continued to the smaller diameter tubular section 11 and is provided on a larger diameter side outer periphery with a vehicle body latch recess 12, a pair of semicircular closing plate sections 14, 15, and a pair of half ring sections 16, 17 that protrude from central circular cut-out portions 14a, 15a at opposed ends of the semicircular closing plate sections 14, 15.

The pair of semicircular closing plate sections 14, 15 has outermost peripheral portions 14b, 15b at a side of connecting to the enlarging diameter tubular section 13. The outermost peripheral portions 14b, 15b have greater thicknesses than the other portions. A most part of the semicircular closing plate sections 14, 15 has small thickness portions 14d, 15d from the outermost peripheral portions 14b, 15b to opposed ends 14c, 15c. A thickness t1 of each of the small thickness portions 14d, 15d is set to be one-third of a thickness t2 of the outermost peripheral portions 14b, 15b. A thickness of each of the half ring sections 16, 17 that protrude from the semicircular closing plate sections 14, 15 is small and equal to the thickness t1 of each of the half ring sections 16, 17.

The small thickness portions 14d, 15d of the semicircular closing plate sections 14, 15 are provided on a part from proximal ends 16a, 17a of the half ring sections 16, 17 to the outermost peripheral portions 14b, 15b with semicircular projections 20 and semicircular depressions 21 that are disposed alternately in a radial direction to an outer peripheral connecting side to said enlarging diameter tubular section to form bellows-like configurations.

In the present embodiment, the semicircular proximal ends 16a, 17a define the depressions 21. The depressions 21 include three parts (21-1, 21-2, and 21-3) in the radial direction. The projections 20 among the depressions 21 include three parts (20-1, 20-2, and 20-3) in the radial direction.

A slit 22 extending in the radial direction is provided between the opposed ends 14c, 15c of the semicircular closing plate sections 14, 15. When the end surfaces 16b, 17b of the half ring sections 16, 17 contact with each other in a radial direction to form a complete circle in section, the slit will be closed.

The half ring sections 16, 17 are provided on outer peripheries at protruding side ends with tape-stoppers 16c, 17c.

The smaller diameter tubular section 11 is also provided on an outer periphery with a tape-stopper 11a. Further, the smaller diameter tubular section 11 is continued to an inner tubular section 24 that protrudes into an interior of the enlarging diameter tubular section 13. The inner tubular section 24 protrudes to a position close to the semicircular closing plate sections 14, 15. The inner tubular section 24 is provided on an outer periphery with substantially triangular support pieces 25 that are spaced apart from one another in a peripheral direction and extend to an inner surface of the enlarging diameter tubular section 13.

The enlarging diameter tubular section 13 is provided on a larger diameter end side with an annular portion 13a having a large thickness. The vehicle body latch recess 12 is provided between the annular portion 13a and a slant wall portion 13b.

Figure 3:
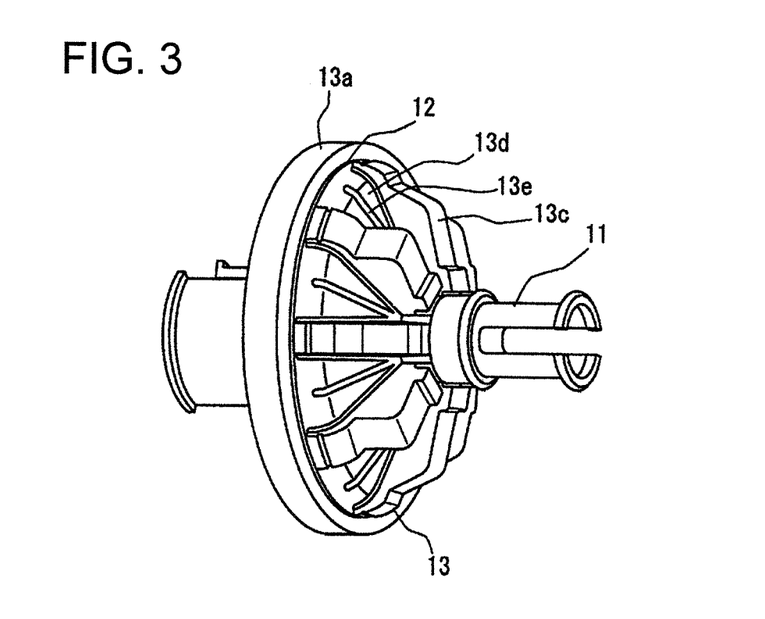
FIG. 3 is a perspective view of the grommet in the first embodiment shown in FIGS. 1A and 1B, illustrating the grommet taken from a side of a smaller diameter tubular section.

As shown in FIG. 3, the slant wall portion 13b is provided with stepped-like projections 13c that are spaced apart from one another in a peripheral direction and protrude in an axial direction. The stepped-like projections 13c are disposed from the smaller diameter tubular section 11 to the vehicle body latch recess 12 in the radial direction. An outer periphery 13d that is not provided with the stepped-like projections 13c is provided with radial recesses 13e.

The wire harness W/H is attached to the grommet 10 by a conventional process. The wire harness W/H is passed through the smaller diameter tubular section 11, the inner tubular section 24, and the enlarging diameter tubular section 13 into the circular cut-out portions 14a, 15a of the semicircular closing plate sections 14, 15 to be surrounded by the half ring sections 16, 17.

An end of the wire harness W/H that passes the grommet 10 is wound by an adhesive tape T1 from an outer surface of the outer end of the smaller diameter tubular section 11 to an outer surface of the wire harness W/H.

The other end of the wire harness W/H is closely contacted with the half ring sections 16, 17. After winding an adhesive tape T2 around outer surfaces of the half ring sections 16, 17, the adhesive tape T2 is wound around the outer surface of the wire harness W/H protruding from the half ring sections 16, 17.

Figure 4A:
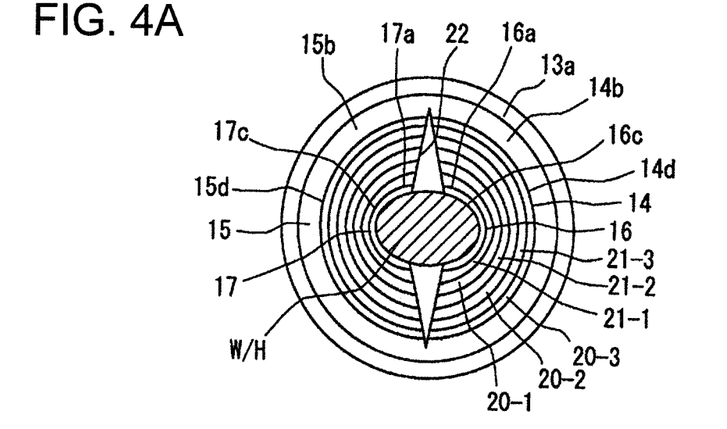
FIGS. 4A to 4C are rear side views of the grommets, illustrating operational effects of the bellows-like configurations of the pair of semicircular closing plate sections.
Figure 4B:
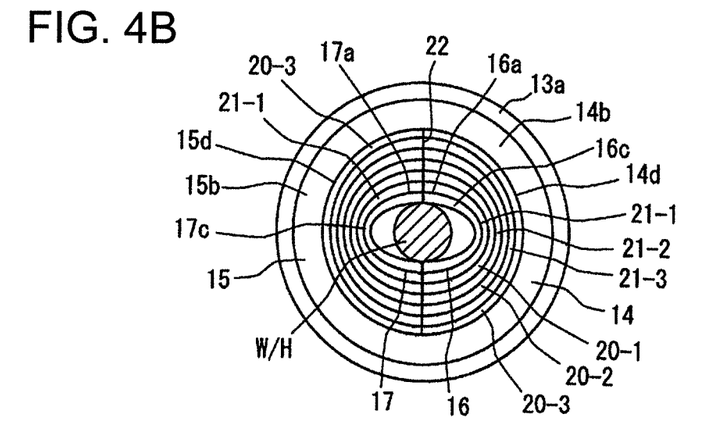

In the case where an outer diameter of the wire harness W/H is maximum within an imaginable range when winding the adhesive tape T2 around the half ring sections 16, 17 (FIG. 4A) or in the case where the outer diameter of the wire harness W/H is minimum within an imaginable range (FIG. 4B), as shown in FIGS. 4A and 4B, the half ring sections 16, 17 become an oval figure in cross section by the adhesive tape T2. Consequently, the innermost depression parts 21-1 in the proximal ends 16a, 17a of the half ring sections 16, 17 become an oval figure in cross section. The projection parts 20-1 . . . and the depressions 21-2 . . . continued to the innermost depression part 21-1 in the radial direction have smaller pitches between the projection parts and the depression parts in a longer axis direction of the oval figure. On the other hand, the pitches between the projection parts and the depression parts in a shorter axis direction of the oval figure become great. The projection parts 20-3 continued to the outermost thick portions 14b, 15b change the pitch to be a complete circle. Thus, the bellows-like thin portions 14d, 15d absorb deformation of the semicircular closing plate sections 14, 15 so that the oval figure at the central side is changed to the complete circle at the outer side.

Figure 4C:
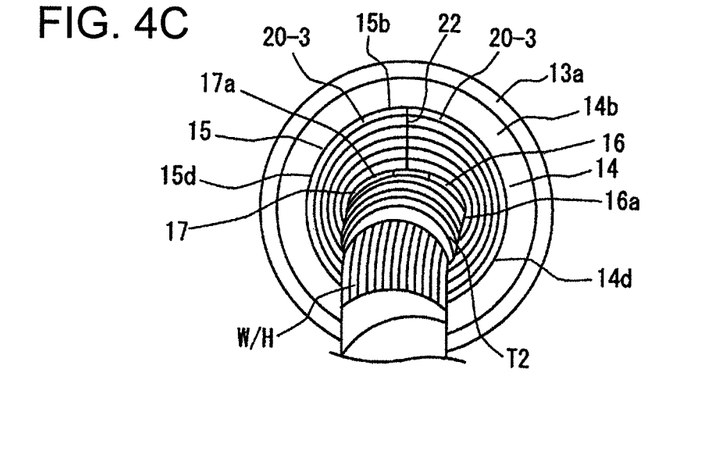

As shown in FIG. 4C, in the case where the wire harness H/W drawn out of the half ring sections 16, 17 is bent abruptly, pitches between the projection parts and depression parts of the semicircular closing plate sections 14, 15 become small at a bent side of the proximal ends 16a, 17a of the bent half ring sections 16, 17 while the pitches become great at the opposite side. In this case, at the bent side where the pitches between the projection and depression parts become small, the pitches are widened gradually toward the outer periphery and at the opposite side where the pitches become great, the pitches are narrowed gradually toward the outer periphery. Accordingly, as is the case with the condition shown in FIGS. 4A and 4B, the pitches at the projection parts 20-3 continued to the outermost thick outer peripheral portions 14b, 15b are changed so that the semicircular closing plate sections 14, 15 become a complete circle.

Thus, in the case where the outer diameter of the wire harness W/H becomes maximum, as shown in FIG. 4A; in the case where the outer diameter of the wire harness W/H becomes minimum, as shown in FIG. 4B; or in the case where the wire harness W/H is bent abruptly, as shown in FIG. 4C; the bellows-like thin portions 14d, 15d of the semicircular closing plate sections 14, 15 absorb deleterious effects caused by deformation of the half ring sections 16, 17 on which the adhesive tape T2 is wound and do not affect the enlarging diameter tubular section 13, thereby holding the vehicle body latch recess 12 provided on the outer periphery of the enlarging diameter tubular section 13 to be in the complete circle.

The grommet 10 secured to the wire harness W/H by the adhesive tapes T1, T2, as shown in FIGS. 1A and 1B, is attached to a through-hole H in a vehicle body panel 50 that partitions a vehicle body into an engine room X and a passenger room Y.

The smaller diameter tubular section 11 of the grommet 10 is inserted into the through-hole H at a side of the engine room X. The enlarging diameter tubular section 13 is pushed into the through-hole H, a peripheral edge around the through-hole H falls down into the vehicle body latch recess 12, and the grommet 10 is engaged with the through-hole H.

When the grommet 10 is attached to the through-hole H, since the enlarging diameter tubular section 13 brings the stepped projection portions 13c (not the whole outer periphery of the section 13) with contact with the inner periphery of the through-hole H, an inserting force can be lowered and the enlarging diameter tubular section 13 can be deflected inward about the recesses 13e. This can reduce the inserting force.

When the vehicle body latch recess 12 engages the inner peripheral edge around the through-hole H and the whole bottom surface of the vehicle body latch recess 12 closely contacts with the inner periphery of the through-hole H, it is possible to prevent water from entering the passenger room Y from the engine room X.

On the contrary, if the vehicle body latch recess 12 is deformed and the bottom surface continued to the recess 12 does not become a complete circle, the bottom surface does not contact closely with the inner periphery of the through-hole. This will be unable to prevent water from entering the passenger room Y from the engine room X.

However, as described above, since the bellows-like semicircular closing plate sections 14, 15 can absorb deformation of the half ring sections 16, 17 caused on account of the small or large diameter of the wire harness W/H or bending of the wire harness, thereby not deforming the enlarging diameter tubular section 13 provided with the vehicle body latch recess 12, it is possible to closely contact the whole bottom surface of the vehicle body latch recess 12 with the inner periphery of the through-hole H, thereby maintaining a waterproofing function.

Figure 5:
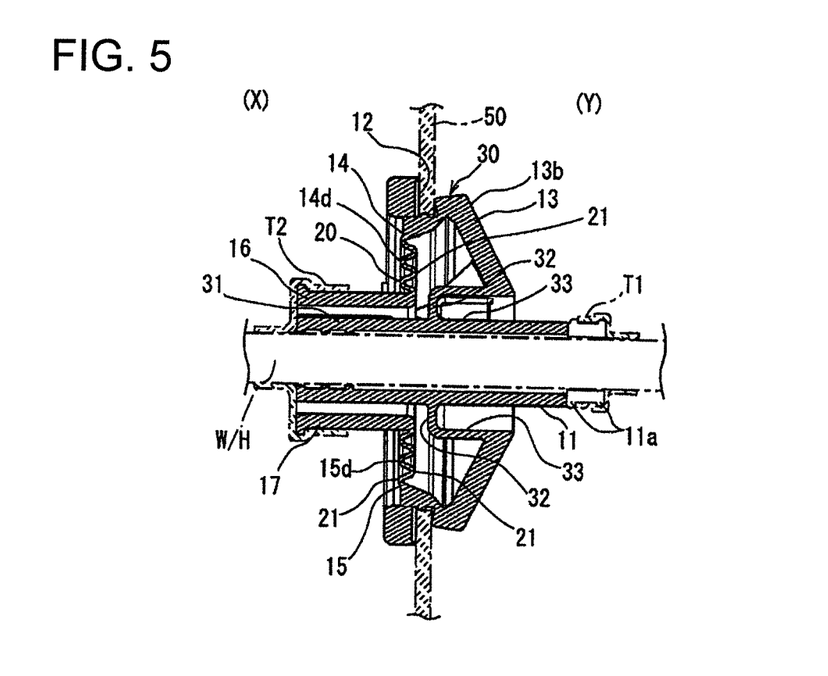
FIG. 5 is a longitudinal section view of a second embodiment of a grommet in accordance with the present invention.
Figure 6:
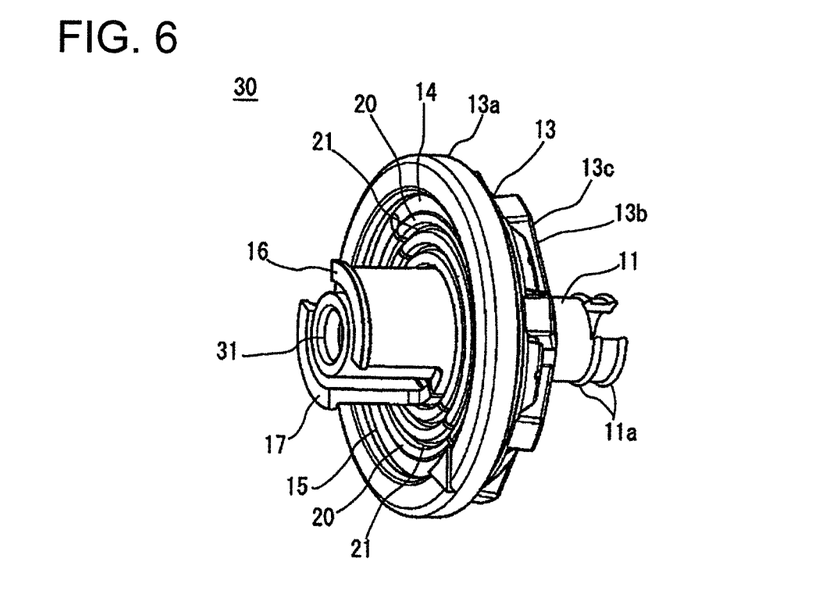
FIG. 6 is a perspective view of the grommet in the second embodiment, illustrating bellows-like configurations of a pair of semicircular closing plate sections.
Figure 7:
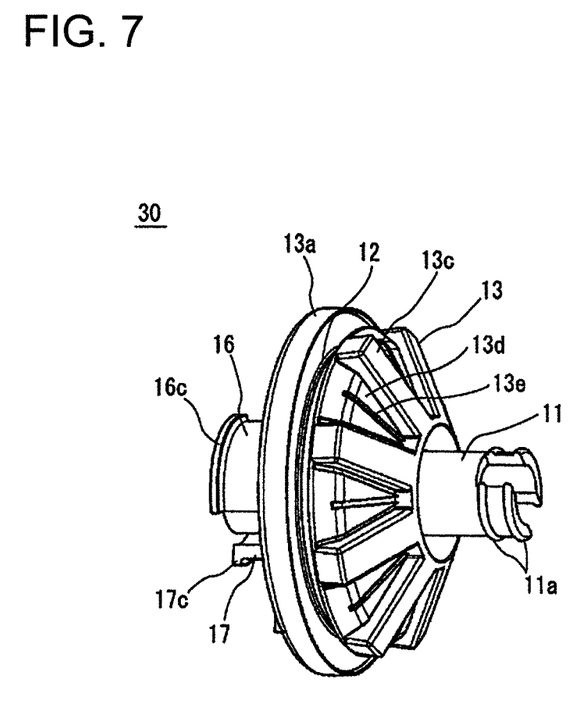
FIG. 7 is a perspective view of the grommet in the second embodiment, illustrating the grommet taken from a side of a smaller diameter tubular section.

FIGS. 5 to 7 show a second embodiment of a grommet 30 in accordance with the present invention.

The grommet 30 in the second embodiment includes: an enlarging diameter tubular section 13; a smaller diameter tubular section 31 that extends in an axial direction from a smaller diameter end side of the section 13 (as is the case with a conventional structure shown in FIGS. 8A and 8B); a pair of semicircular closing plate sections 14, 15 extending from a larger diameter end of the section 13 in the radial direction; a pair of half ring sections 16, 17 extending from ends of the sections 14, 15 outside the smaller diameter inner tubular section 31 to define an outer tube for surrounding the smaller diameter inner tubular section 31. The grommet 30 in the second embodiment differs from the grommet 10 in the first embodiment with respect to the above structure.

However, the thin portions 14d, 15d of the semicircular closing plate sections 14, 15 are provided with projections 20 and depressions 21 that are spaced apart from one another alternately in the radial direction to absorb deformation of the half ring sections 16, 17. These structures in the second embodiment are the same as those in the first embodiment.

The smaller diameter inner tubular section 31 passes the enlarging diameter tubular section 13 and semicircular closing plate sections 14, 15 and is continued to a smaller diameter tubular section 11 that protrudes outward from the enlarging diameter tubular section 13, as is the case with the structure in the first embodiment.

The smaller diameter tubular section 11 is not connected directly to the smaller end side of the enlarging diameter tubular section 13 but is connected through a bent coupling portion 32 to the smaller end of the section 13 to define a recess 33 extending along the smaller diameter tubular section 11.

Stepped projections 13c protrude straightly from the outer periphery of the enlarging diameter tubular section 13 and are not provided with any bent portions.

Since the other structures including the vehicle body latch recess 12 in the second embodiment are the same as those in the first embodiment, explanations of them are omitted by giving the same signs to the same elements in the second embodiment.

The grommet 30 in the second embodiment passes the wire harness W/H through the smaller diameter tubular section 11 and the smaller diameter inner tubular section 31. An end of the wire harness W/H is secured to the smaller diameter tubular section 11 by winding the adhesive tape T1.

The other end of the wire harness W/H is secured to the half ring sections 16, 17 by winding the adhesive tape T2, with the outer periphery of the smaller diameter inner tubular section 31 being closely contacted with the half ring sections 16, 17. In the case where the wire harness W/H that passes the smaller diameter inner tubular section 31 is the same conditions as the first embodiment shown in FIGS. 4A to 4C, the smaller diameter inner tubular section 31 is deformed into an oval figure in cross section, and the half ring sections 16, 17, on which the adhesive tape T2 is wound, are deformed into the oval figure in cross section.

However, as is the case with the conditions shown in FIGS. 4A to 4C in the first embodiment, the bellows-like semicircular closing plate sections 14, 15 comprising the projections 20 and depressions 21 are partially stretched and compressed to absorb deformation of the half ring sections 16, 17, thereby holding the outermost thick portions 14b, 15b to be in the complete circle. Accordingly, the enlarging diameter tubular section 13 and vehicle body latch recess 12 are not affected by the deformation of the half ring sections 16, 17 and the vehicle body latch recess 12 can maintain the complete circle in cross section to closely contact with the inner periphery of the through-hole, thereby obtaining a stable waterproofing function.

The invention claimed is:

1. A grommet comprising:
    a smaller diameter tubular section having opposite front and rear ends spaced apart along an axial direction diametrically opposed slits extending into the front end;
    an enlarging diameter tubular section projecting outward and rearward from an intermediate location on said smaller diameter tubular section, the intermediate location is forward of the rear end of the smaller diameter tubular section and rearward of the slits, the enlarging diameter tubular section is provided on an outer periphery of a larger diameter side with a vehicle body latch recess;

a pair of semicircular closing plate sections that protrude from inner peripheries of the larger diameter side of said enlarging diameter tubular section in a direction perpendicular to an axial direction, inner ends of the semicircular closing plate sections being formed with semicircular cut-out portions spaced from the smaller diameter tubular section, the semicircular closing plate sections defining bellows with arrays of alternating semicircular projections and semicircular depressions, the semicircular closing plate sections being thinner than the enlarging diameter tubular section; and a pair of half ring sections that protrude rearward from peripheral edges of the semicircular cut-out portions at opposed ends of said pair of semicircular closing plate sections, the half ring sections being spaced from the smaller diameter tubular section at least in an unbiased state of the grommet;

wherein after a wire harness passes said smaller diameter tubular section, said enlarging diameter tubular section, and said pair of half ring sections, an adhesive tape is wound around outer peripheries of said pair of half ring sections, and said vehicle body latch recess provided on the outer periphery of said enlarging diameter tubular section is engaged with a vehicle body panel; and wherein said pair of half ring sections are deformed in accordance with an outer diameter of said wire harness secured to said half closing sections by winding of said adhesive tape, and deformation of said semicircular closing plate sections is absorbed by stretch and compression of said bellows before the deformation is propagated to the outer periphery of the enlarging diameter tubular section, so that deformation of said vehicle body latch recess of said enlarging diameter tubular section coupled to an outer periphery side of said semicircular closing plate sections is prevented.

2. A grommet according to claim 1, wherein an outer periphery of said wire harness is directly covered with said pair of half ring sections that protrude from said pair of semicircular closing plate sections, said opposed ends of said semicircular closing plate sections are joined to each other when winding said adhesive tape.

3. A grommet according to claim 1, wherein the half ring sections are spaced rearward of the smaller diameter tubular section.

* * * * *